United States Patent [19]
Seo

[11] Patent Number: 5,764,467
[45] Date of Patent: Jun. 9, 1998

[54] APPARATUS FOR PROTECTING SWITCH-MODE POWER SUPPLIES CONNECTED IN PARALLEL FROM OVERVOLTAGE

[75] Inventor: In Young Seo, Suwon, Rep. of Korea

[73] Assignee: Samsung Electro-Mechanics Co.,Ltd., Suwon, Rep. of Korea

[21] Appl. No.: 691,940

[22] Filed: Aug. 5, 1996

[30] Foreign Application Priority Data

Nov. 30, 1995 [KR] Rep. of Korea ............... 95-38129 U

[51] Int. Cl.$^6$ ..................................... H02H 3/20
[52] U.S. Cl. ............................. 361/91; 361/93
[58] Field of Search ...................... 361/18, 21, 56,
361/86, 88, 91, 93; 307/52, 71, 106, 130,
131; 363/55, 56, 65, 71; 327/74, 68, 82,
96, 560, 561, 563

[56] References Cited

U.S. PATENT DOCUMENTS 4,877,972  10/1989  Sobhani et al. ............... 361/93

Primary Examiner—Jeffrey A. Gaffin
Assistant Examiner—Ronald W. Leja
Attorney, Agent, or Firm—Ladas & Parry

[57] ABSTRACT

An apparatus for protecting switch-mode power supplies connected in parallel (SMPS) from overvoltage by ceasing operation of the load sharing circuit when voltage higher than a predetermined voltage level is applied to the load sharing pin. Under normal operation of the load sharing circuit in the prior art SMPS, all sets of SMPS connected in parallel equally share the loaded voltage. If heavy voltage is continuosly applied to the load sharing pin, however, all sets of SMPS connected to the load sharing pin malfunction, thereby driving SMPS out of order. The present invention is to provide a protection circuit to prevent all sets of SMPS from malfunctioning when heavy voltage is applied to the load sharing pin which exchanges load sharing signals in a plurality of SMPS connected in parallel.

8 Claims, 2 Drawing Sheets

5,764,467

1

APPARATUS FOR PROTECTING SWITCH-MODE POWER SUPPLIES CONNECTED IN PARALLEL FROM OVERVOLTAGE

BACKGROUND OF THE INVENTION

1. Field of the Invention

The present invention relates to an apparatus for protecting switch-mode power supplies (SMPS) connected in parallel from overvoltage, and more particularly to an apparatus for protecting a plurality of SMPS connected in parallel by ceasing operation of the load sharing circuit when voltage higher than a predetermined voltage level is applied to the load sharing pin.

2. Description of the Prior Art

FIG. 1 illustrates an example of a conventional apparatus for protecting SMPS connected in parallel from overvoltage. Referring to FIG. 1, the prior art SMPS include a voltage amplifier 30 for amplifying the voltage difference value between an voltage 18 corresponding to a detected current flowing from one SMPS and an input reference voltage 14, a load sharing amplifier 32 for amplify an output signal of a first amplifier 30 with a load sharing signal 12 of another SMPS, and a control amplifier 34 for amplifying the output signal of the load sharing amplifier 32 and an output supply voltage 16 of an output of SMPS to supply a voltage control signal to the feedback pin of the main integrated circuit (IC), PMW IC.

The operation of the prior art SMPS as constructed above will now be explained with reference to FIG. 1.

According to FIG. 1, a voltage amplifier 30 amplifies a voltage difference between the voltage 18 corresponding a detected output current flowing through an output of one set of SMPS and the input reference voltage 14, and then supplies the amplified voltage to a load sharing amplifier 32. The load sharing amplifier 32 compares the output voltage of the voltage amplifier 30 and a load sharing signal 12 of another set of SMPS to supply its output signal to a control amplifier 34. The control amplifier 34 amplifies a voltage difference between the output reference voltage 10 superimposed on the output signal of the load sharing amplifier 32 and the output voltage 16 of an output of a SMPS to supply a pulse width modulation (PWM) control signal as a feedback signal of the SMPS.

However, the prior art SMPS as shown in FIG. 1 has a drawback. Under normal operation of the load sharing circuit, all sets of SMPS connected in parallel equally share the loaded voltage. If heavy voltage is continuously applied to the load sharing pin, however, all the SMPS connected to the load sharing pin malfunction, thereby driving SMPS out of order.

SUMMARY OF THE INVENTION

The present invention has been devised to solve the aforementioned drawback. It is therefore an object of the present invention to provide an apparatus for protecting a switch-mode power supplies connected in parallel from overvoltage, which can protect a plurality of SMPS connected in parallel when a voltage level higher than a predetermined voltage level is detected on the load sharing pin of the operating set of SMPS by ceasing operation of the load sharing circuit to prevent malfunction of any of the SMPS.

In order to achieve the above object, the present invention provides an apparatus for protecting a switch-mode power supplies (SMPS) connected in parallel from overvoltage, comprising:

2 voltage dividing means for dividing a voltage corresponding a detected current flowing through an output of one set of SMPS and providing two divided voltages;

a protection-setting amplifier for amplifying a voltage difference between said two divided voltages provided from said voltage dividing means;

voltage amplifying means for amplifying said voltage corresponding a detected output current flowing through an input reference voltage to produce a first amplified voltage, comparing said first amplified voltage with a load sharing signal of another SMPS to produce a second amplified voltage, and then amplifying an output voltage of said protection-setting amplifier with said load sharing signal of said another SMPS to produce a third compared voltage, said voltage amplifying means including means for interrupting said second amplified voltage to be outputted therefrom using said third amplified voltage if a voltage level of said load sharing signal of said another SMPS is higher than said output voltage of said protection-setting amplifier; and a control amplifier for amplifying a voltage difference value between an output supply voltage of an output of SMPS and an output reference voltage which is superimposed on said second compared voltage from said voltage amplifying means to supply a pulse width modulation (PWM) control signal.

BRIEF DESCRIPTION OF THE DRAWINGS

The above object and other features of the present invention will become more apparent with the following description of the preferred embodiments with reference to the accompanying drawings, in which.

DESCRIPTION OF THE PREFERRED EMBODIMENTS

Figure 1:
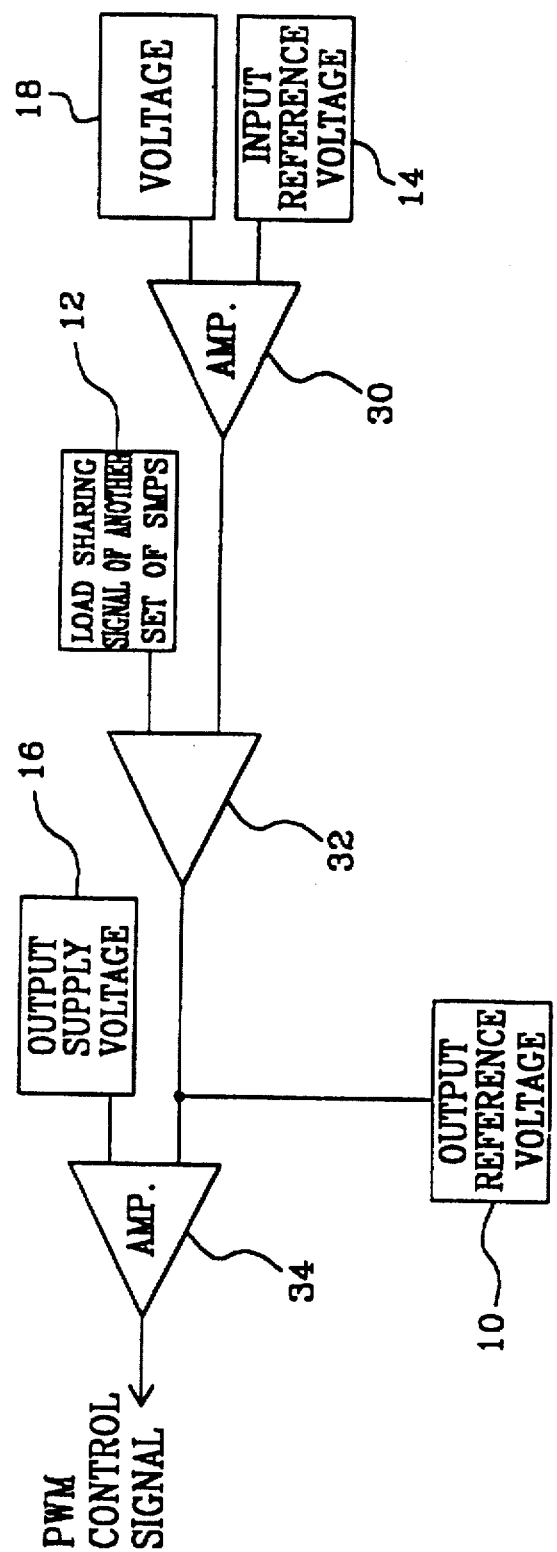
FIG. 1 is a circuit diagram illustrating an embodiment of an apparatus for protecting the SMPS connected in parallel from overvoltage according to the prior art.
Figure 2:
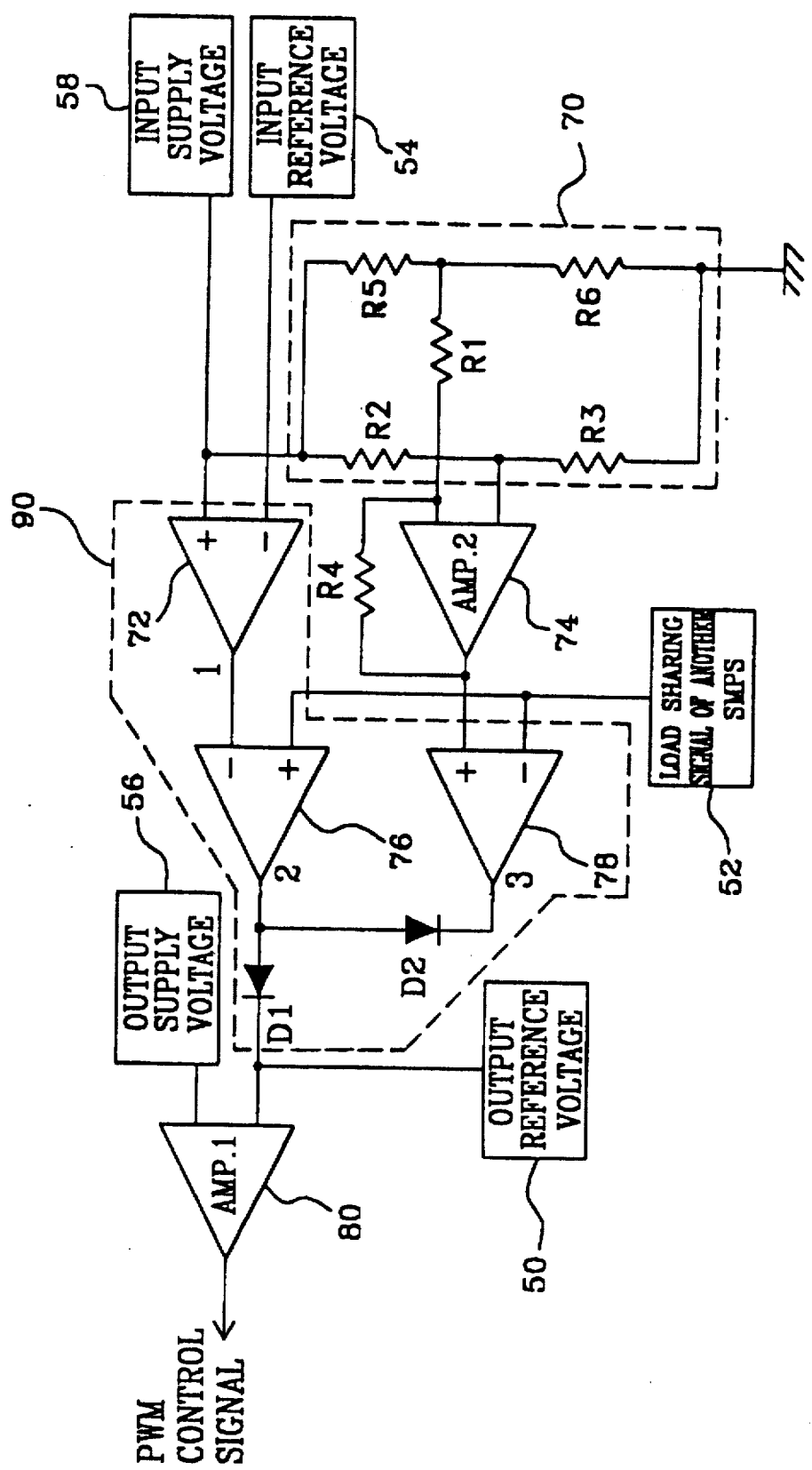
FIG. 2 is a circuit diagram illustrating a preferred embodiment of an apparatus for protecting the SMPS connected in parallel from overvoltage according to the present invention.

Referring to FIG. 2, the present invention provides an apparatus for protecting switch-mode power supplies connected in parallel from overvoltage, comprises a voltage dividing section 70 for dividing a voltage corresponding to a current flowing from an output of one SMPS 58 and providing two divided voltages, a protection-setting amplifier 74 for amplifying a voltage difference between the two divided voltages provided from the voltage dividing section 70 into an output voltage, voltage amplifying section 90 for amplifying the voltage corresponding to the output current with an input reference voltage 54 to produce a first amplified voltage, amplifying the first amplified voltage with a load sharing signal 52 of another SMPS to produce a second amplified voltage, and amplifying the output voltage of the protection-setting amplifier 74 with the load sharing signal 52 of the another SMPS to produce a third amplified voltage, the voltage amplifying section 90 being arranged for interrupting the second amplified voltage to be outputted therefrom using the third amplified voltage if a voltage level of the load sharing signal 52 of the another SMPS is higher than the output voltage of the protection-setting amplifier 74, and a control amplifier 80 for amplifying a voltage difference value between an output supply voltage 56 of an output SMPS and an output reference voltage 50 which is superimposed on the second amplified voltage from the voltage amplifying section 90 to supply a pulse width modulation (PWM), PWM IC control signal as a feedback signal of the SMPS.

The voltage dividing section 70 includes voltage dividing resistors R1, R2, R3, R5 and R6 for dividing the voltage 58 corresponding a detected current flowing through an output of SMPS into two divided voltage. The voltage amplifying section 90 includes a first voltage amplifier 72 for amplifying the voltage 58 corresponding a detected current flowing through an output of one set of SMPS with the input reference voltage 54 to provide a compared voltage difference value, a second load sharing amplifier 76 for amplifying the output voltage of the first voltage amplifier 72 with the load sharing signal 52 of another SMPS, and a third protection amplifier 78 for amplifying the output voltage of the protection setting amplifier 74 with the sharing signal 52 of another SMPS to amplify the compared voltage difference value.

The working effect of the present invention constructed above will now be described with reference to the drawings.

Referring to FIG. 2, the voltage 58 corresponding a detected current flowing through an output of SMPS is applied to a non-inverting terminal + and the input reference voltage 54 is applied to the inverting terminal − of the first amplifier 72 of the voltage amplifying section 90. The first voltage amplifier 72 then amplifies the input voltages to supply the voltage difference value to the inverting terminal − of the second load sharing amplifier 76.

The second load sharing amplifier 76 amplifies the input voltage of the inverting terminal − with the load sharing signal 52 of another set of SMPS which is applied to the non-inverting terminal +.

Meanwhile, the voltage dividing section 70 divides the voltage corresponding a detected current flowing through an output of SMPS into resistors R1, R2, R3, R5 and R6 to provided two divided voltages to two input terminals of the protection setting amplifier 74 connected resistor R4 between input and output. Then, the protection setting amplifier 74 amplifies the voltage defference between the two divided voltages 58 to supply them to the non-inverting terminal + of the third protection amplifier 78. The third protection amplifier 78 amplifies the input voltage of the non-inverting terminal + with the load sharing signal 52 of another set of SMPS, which is applied to the inverting terminal − to supply the voltage difference value to the diode D2.

Because diodes D1, D2 are connected between voltage amplifier section 90 and an input control amplifier 80, the diodes D1, D2 selectively interrupt the output voltage of the voltage amplifier section 90 in response to the load sharing signal of the set of SMPS inputted to the voltage amplifier section 90.

The control amplifier 80 amplifies the voltage difference of the second load sharing amplifier 76 with the output supply voltage 56 superimposed on the output voltage of the output reference voltage 50, and apply the PWM control signal as the feedback signal of the main intergrated circuit (IC), PWM IC (not shown in FIG. 2). An output voltage is controlled by controlling the main switch according to a control signal applied to the PWM IC.

According to the present invention, the load sharing circuit ceases operation to prevent malfunctioning of the SMPS when voltage higher than a predetermined voltage level detected by the operating SMPS (the level is determined by the protection setting amplifier 74) is applied to the load sharing pin.

Under the assumption that the resistors R1 and R2, and the resistors R3 and R4 have the same values, respectively, the output signal of the protection setting amplifier will be expressed by the following equation.

$$V_O = \frac{R4}{R1} \times \left(1 - \frac{R6}{R5+R6}\right) \times V_A$$

If the voltage value of the load sharing voltage 52 of the other set of SMPS is greater than the output signal $V_O$ of the protection setting amplifier 74 of $$\frac{R4}{R1} \times \left(1 - \frac{R6}{R5+R6}\right) \times V_A,$$

the load sharing circuit ceases operation, thereby protecting all sets of SMPS.

The present invention as described above has an working effect of protecting the load sharing circuit of the SMPS from overvoltage by providing a protection circuit, which does not cause malfunction in any set of SMPS even if excessive voltage is applied to the load sharing pin exchanging load sharing signals, when activating more than one set of SMPS connected in parallel having a load sharing function.

What is claimed is:

1. An apparatus for protecting switching-mode power supplies (SMPS) connected in parallel from overvoltage, comprising:

voltage dividing means for dividing a voltage corresponding a current from an output of one SMPS into two divided voltages;

a protection-setting amplifier for amplifying a voltage difference between said two divided voltages provided from said voltage dividing means into an output voltage;

voltage amplifying means for amplifying said voltage corresponding a current to produce a first amplified voltage, amplifying said first amplified voltage with a load sharing signal of another SMPS to produce a second amplified voltage, and amplifying said output voltage of said protection-setting amplifier with said load sharing signal of said another SMPS to produce a third amplified voltage, said voltage amplifying means including means for interrupting said second amplified voltage using said third amplified voltage if a voltage level of said load sharing signal of said another SMPS is higher than said output voltage of said protection-setting amplifier; and a control amplifier for amplifying a voltage difference value between an output supply voltage of an output SMPS and an output reference voltage superimposed on said second amplified voltage to supply a pulse width modulation (PWM) control signal.

2. The apparatus for protecting switching-mode power supplies connected in parallel from overvoltage of claim 1, wherein said voltage dividing means includes voltage dividing resistors.

3. The apparatus for protecting switching-mode power supplies connected in parallel from overvoltage of claim 1, wherein said voltage amplifying means includes:

a first voltage amplifier for said amplifying of said voltage corresponding a current with an input reference voltage to supply said first amplified voltage as an amplified voltage difference value;

a load sharing amplifier for said amplifying of said first voltage; and a protection amplifier for said amplifying of said output voltage of said protection-setting amplifier with said load sharing signal.

4. The apparatus for protecting switching-mode power supplies connected in parallel from overvoltage of claim 1, wherein said interrupting means comprises diodes.

5. The apparatus for protecting switching-mode power supplies connected in parallel from overvoltage of claim 2, wherein said voltage amplifying means includes:

a first voltage amplifier for said amplifying of said voltage corresponding a current with an input reference voltage to supply said first amplified voltage as an amplified voltage difference value;

a load sharing amplifier for said amplifying of said first voltage; and a protection amplifier for said amplifying of said output voltage of said protection-setting amplifier with said load sharing signal.

6. The apparatus for protecting switching-mode power supplies connected in parallel from overvoltage of claim 2, wherein said interrupting means comprises diodes.

7. The apparatus for protecting switching-mode power supplies connected in parallel from overvoltage of claim 3, wherein said interrupting means comprises diodes.

8. The apparatus for protecting switching-mode power supplies connected in parallel from overvoltage of claim 5, wherein said interrupting means comprises diodes.

* * * * *